US00RE34487E

United States Patent [19]

Keller

[11] E Patent Number: Re. 34,487

[45] Reissued Date of Patent: Dec. 28, 1993

[54] DISPENSING APPARATUS FOR OPERATING DOUBLE CARTRIDGES

[76] Inventor: Wilhelm A. Keller, Grundstrasse 12, CH-6343 Rotkreuz, Switzerland

[21] Appl. No.: 822,437

[22] Filed: Jan. 17, 1992

Related U.S. Patent Documents

Reissue of:

[64] Patent No.: 5,005,735
Issued: Apr. 9, 1991
Appl. No.: 194,803
Filed: May 17, 1988

[51] Int. Cl.[5] ..... B67D 5/52

[52] U.S. Cl. ..... 222/137; 222/325; 222/327; 222/386

[58] Field of Search ..... 222/137, 263, 325, 326, 222/327, 334, 386, 389, 390, 391, 570; 403/381

[56] References Cited

U.S. PATENT DOCUMENTS

| | | | |
|---|---|---|---|
| 2,745,575 | 5/1956 | Spencer | 222/390 X |
| 3,279,660 | 10/1966 | Collar | 222/397 |
| 3,330,444 | 7/1967 | Raypholtz | 222/137 |
| 3,828,980 | 8/1974 | Creighton et al. | 222/137 |
| 3,983,947 | 10/1976 | Wills et al. | 222/389 X |
| 4,471,888 | 9/1984 | Herb et al. | 222/391 X |
| 4,566,610 | 1/1986 | Herb | 222/137 |
| 4,676,410 | 6/1987 | von Flue | 222/389 X |
| 4,753,536 | 6/1988 | Spehar et al. | 222/494 X |
| 4,826,053 | 5/1989 | Keller | 222/340 |
| 4,869,400 | 9/1989 | Jacobs | 222/137 |

FOREIGN PATENT DOCUMENTS 0236129 9/1987 European Pat. Off. .

*Primary Examiner*—David H. Bollinger
*Attorney, Agent, or Firm*—McAulay Fisher Nissen Goldberg & Kiel

[57] ABSTRACT

In dispensing apparatus for operating double cartridges with holding flange, a front-face retaining guide with slide-in opening on one side for the holding flange is provided. The problem arises of ensuring effective anchoring between apparatus and cartridge in order to prevent deformations of the holding flange or of the entire cartridge when, for dispensing the cartridge content, the two dispensing plungers of the apparatus are moved out of the apparatus front and push delivery pistons forward which are inserted into the cartridge cylinders. For this purpose, the retaining guide is continuous on both sides of a straight line which connects the centers of both plungers. The slide-in opening extends transversely to the mentioned straight line. Due to this arrangement, the holding flange is rigidly held in the retaining guide, i.e. each of the cartridge cylinders is anchored via the flange at two diametrically opposed locations. Furthermore it becomes possible, in contrast to prior art, to decrease the cartridge flange by lateral sections and to securely anchor even individual cylinders with separate flanges.

9 Claims, 1 Drawing Sheet

DISPENSING APPARATUS FOR OPERATING DOUBLE CARTRIDGES

Matter enclosed in heavy brackets [ ] appears in the original patent but forms no part of this reissue specification; matter printed in italics indicates the additions made by reissue.

FIELD OF THE INVENTION

The invention relates to a dispensing apparatus for operating double cartridges provided with holding flanges, which has a front face retaining guide with slide-in opening on one side for receiving the holding flange as well as two dispensing plungers, which can be moved out of the front of the apparatus along parallel axes.

BACKGROUND OF THE INVENTION

In a dispensing apparatus of this kind (see, for example, EP-A 0 252 401, U.S. Pat. Application Ser. No. 070,033, now U.S. Pat. No. 4,826,053) the two dispensing plungers are arranged side-by-side in the apparatus, and the slide-in opening of the retaining guide is located at the upper edge of the apparatus front. Consequently, the double cartridges with their essentially rectangular holding flanges are slid into the guide from above, and the flange is then held at the lower longitudinal side and the two lateral narrow sides while the upper longitudinal side of the flange remains free. Due to the relatively wide slide-in opening, it must accept at least the diameters of both storage cylinders of the double cartridges being adjacent to each other. Solid anchoring of the cartridge of the dispensing apparatus, however, is simply not achieved. It must also be taken into consideration that this anchoring is subjected to considerable stresses during dispensing of the substance when the plungers act upon the delivery pistons in the cartridge cylinders. This causes bending of the flange and deformations of the cartridge, which can lead to disturbances in material dispensing; during step-wise dispensing, the elastic bending leads to undesirable no-load strokes during each plunger advance and subsequently impairs, due to spring-back resilience, the immediate relief of the delivery piston as was suggested in the above mentioned published application.

This anchoring turns out to be insufficient especially if the two cartridge cylinders are separated longitudinally from each other, i.e. are connected with each other practically only through the holding flange and in the region of the outlet. Some degree of improvement—if any can be achieved at all—is only possible in the known apparatus design by thickening or reinforcing (ribbing) the cartridge holding flange. This, however, raises the material and production costs for the cartridges, which is extremely undesirable for such disposable parts intended for a one-time use.

The present invention is based on the task of achieving rigid anchoring, which can be subjected to high stress, between dispensing apparatus and exchangeable cartridges through suitable apparatus design and without increased costs for the cartridges.

SUMMARY OF THE INVENTION

This task is solved in a dispensing apparatus of the mentioned kind according to the invention in that the retaining guide is continuous on both sides of the straight line connecting the centers of both plungers and the slide-in opening extends transversely to this straight line. This allows for both longitudinal sides of the holding flange to be held continuously in the retaining guide and only one narroW side, corresponding to one single cylinder diameter, remains free at the corresponding short slide-in opening. In this way, with a simple measure and without increased costs, a significantly improved "narrowly held" cartridge holding means is created, which prevents disturbing deformations. Preferred variations, namely lateral insertion in the case of plungers arranged side by side in the apparatus or insertion from above in the case of plungers arranged above one another, are within the inventive scope. A special design of the retaining guide allows even the possibility, surprisingly, of fashioning the holding flange of the cartridge smaller than previously made and, consequently, can achieve, with these disposable parts, savings with respect to material as well as storage and transporting volume.

For a better understanding of the present invention, reference is made to the following description and accompanying drawings while the scope of the invention will be pointed out in the appended claims.

DESCRIPTION OF THE PREFERRED EMBODIMENTS

Figure 1:
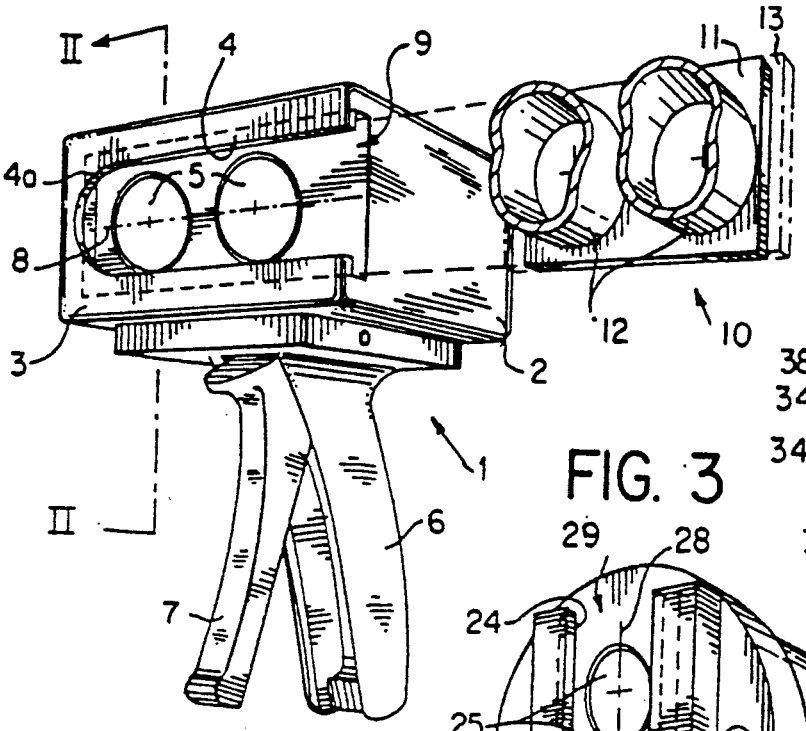
FIG. 1 shows, as first embodiment, a manually operated dispensing apparatus together with a double cartridge (only partially shown) to be slid in laterally.
Figure 2:
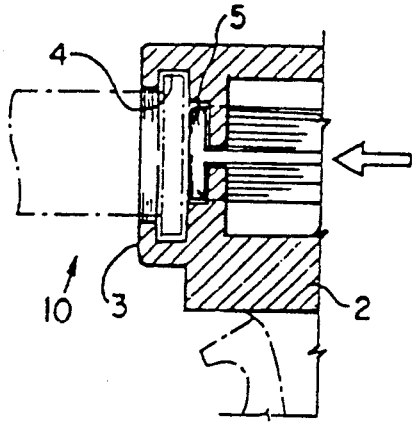
FIG. 2 shows a vertical section through the front area of the apparatus along line II—II in FIG. 1.

The dispensing apparatus 1 according to FIGS. 1 and 2 serves for the exchangeable reception and operation of double cartridge 10, one of which is partially shown next to the apparatus in FIG. 1 ready to be inserted. Such double cartridges 10 (known per se) have, in general, a rectangular holding flange 11, from which two parallel hollow cylinders 12 extend (shown broken). The two cylinders of cartridge 10 serve for separate storage and distribution of two substances generally pasty or viscous, components of a so-called two-component system, which, during dispensing from the cartridge cylinders, are mixed for the purpose of application. For dispensing of the substances from the two cylinders 12, each cylinder contains a delivery piston (not shown), each of which is intended to be actuated upon by one of two delivery plungers 5 of the apparatus 1 (see also EP-A 0 252 401; U.S. patent application Ser. No. 070,033).

The dispensing apparatus 1 has an apparatus body 2 to which a holding grip 6 is fixedly connected. At the apparatus body in the region of the holding grip 6, an actuation lever 7 is articulated, which acts through a mechanism in the interior of the apparatus body 2 (not shown here) upon the two plungers 5. The plungers 5 are shown in FIGS. 1 and 2 in their starting position, i.e. inserted in the apparatus body 2. Upon actuating the lever 7, they are moved parallel out of the apparatus front 3 and pressed against the delivery pistons of an inserted cartridge 10, whereby these delivery pistons are moved forward and the cartridge content is being dispensed. For receiving the holding flange 11 of a double cartridge, a retaining guide 4 is provided on the apparatus front 3. For sliding cartridge 10 in and out, the retaining guide 4 has a slide-in opening 9, which is—in the represented apparatus design with plungers 5 arranged side by side—located on a (left or right) lateral edge of the apparatus front 3. Consequently, the slide-in opening 9 extends transversely to a straight line 8, which connects the centers of the two plungers 5. The retaining guide 4 is continuous on both sides of the mentioned straight line 8, and at its end opposing the slide-in opening 9, it forms a stop for positioning the holding flange 11.

Preferentially—as shown—at the mentioned end of the retaining guide, the front opening 4a is shaped semicircularly corresponding to the circumference of a cartridge cylinder 12, with the guide 4 itself ending tangentially to the semi-circle.

The holding flange 11 of an inserted double cartridge 10, consequently, is held continuously by the retaining guide 4 on the one narrow side as well as on both longitudinal sides; only the second narrow side is free over a distance corresponding to the diameter of a single cartridge cylinder. This brings about a very stable connection between apparatus and cartridge, which can resist even high stresses during the advance of the two dispensing plungers without significant deformations of the flange or the cartridge occurring.

With apparatus of known design, in which the retaining guide has only one longitudinal side, but comprises both narrow sides of the holding flange, the flange by necessity must project on both narrow sides by sections 13 beyond the outer cylinder diameter as is indicated in FIG. 1 in dot-dash lines. In the previously mentioned preferred design of the front opening 4a and the stop end of the retaining guide, these sections 13 can be omitted, i.e. the holding flange 11 can end at its two narrow sides tangentially and flush with the cartridge cylinders 12. Hence, the present design of the retaining guide permits savings of material in the disposable cartridge 10, which is to be produced in large numbers and as inexpensively as possible. On the other hand, the present retaining guide can, of course, also be designed for receiving conventional double cartridges with lateral sections 13 projecting on the holding flange.

Lastly, the present design of the dispensing apparatus also permits the receipt of individual, i.e. separate cartridge cylinders provided with holding flange in pairs or individually (for one-component systems), which is completely impossible with apparatus according the to prior art.

Figure 3:
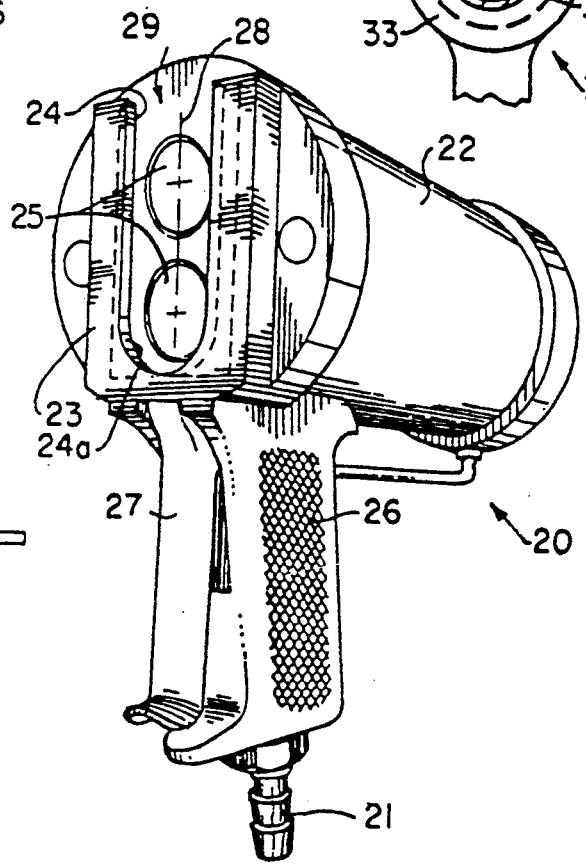
FIG. 3 shows, as second embodiment, a dispensing apparatus with pneumatic plunger drive and cartridge insertion from above.

The dispensing apparatus 20 according to FIG. 3 is, in a manner known per se, intended to be driven with compressed air. The apparatus body is accordingly formed essentially by a cylinder/piston unit 22. A compressed air connection 21 is connected below at handle 26 to the apparatus front 23. A compressed air control valve (not visible) to be actuated by grip 27 is built into handle 26. The two dispensing plungers 25, which can move out of the apparatus front 23 along parallel axes, are connected with the piston (not shown) in the interior of the apparatus body 22 and arranged vertically above one another in the apparatus. The slide-in opening 29 of the retaining guide 24 in this plunger arrangement is at the upper edge of the apparatus front 23; it extends again transversely to the straight line 28, which connects the centers of the two plungers 25. The retaining guide 24 is continuous on both sides of the straight line 28 and formed in the lower region preferably corresponding to the first embodiment, in that the front recess 24a forms a semi-circle adapted to the circumference of a cartridge cylinder and the guide 24 extends at the lower end tangentially to this semi-circle.

Into the dispensing apparatus 20, double cartridges 10 are inserted from above, and, specifically, with vertically extending longitudinal sides of the holding flange 11, i.e. in a position rotated by 90° relative to FIG. 1. With respect to rigid anchoring of the double cartridges in the retaining guide 24, design possibilities of the retaining guide and of the cartridge holding flange as well as possibilities of inserting independent single cartridges, the description relative to the embodiment according to FIGS. 1 and 2 is applicable.

Figure 4:
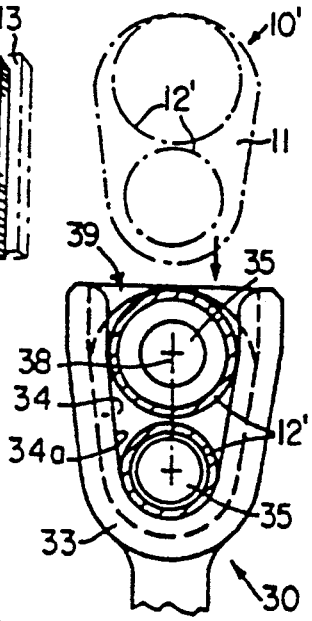
FIG. 4 is the front view of an additional apparatus variant for cartridges with unequal cylinders, the outline of which is indicated above the apparatus with dot-dash lines.

As the additional embodiment according to FIG. 4 shows, a dispensing apparatus 30 can readily be designed along the same principle for receiving and operating double cartridges 10', the two cylinders 12' of which have unequal diameters and the holding flanges 11' of which have, accordingly, the shown outline. The apparatus—here with delivery plungers 35 above one another and slide-in opening 39 arranged at the upper edge of the apparatus front 33—is designed with a retaining guide 34, which is symmetrical to the straight line 38 connecting the two plunger centers. Sections of the guide continuous on both sides are inclined relative to each other corresponding to the shape of flange 11'. The front opening 34a is preferably shaped so that, on an inserted cartridge, it is laterally in contact with both cylinders and below is led around the smaller cylinder. Hence, rigid dynamic anchoring of the holding flange is again brought about, which would not be possible according to prior art.

It should be mentioned, in addition, that, it is not necessary for the present invention that a holding flange on the double cartridges be unitarily connected with the cartridge cylinders; a loose flange plate (for example made of metal, to be used repeatedly, essentially rectangular) with openings, through which the cylinders can be inserted, would also be conceivable, which then would only be provided with narrow annular flanges for contact on the flange plate.

While the foregoing description and drawings represent the preferred embodiments of the present invention, it will be obvious to those skilled in the art that various changes and modifications may be made therein without departing from the true spirit and scope of the present invention.

I claim:

1. In a dispensing apparatus adapted for operation double cartridges of the type having an elongated holding flange with two sides longer than the two ends thereof, said apparatus having a front and a retaining guide thereon with a slide-in opening on one side of said guide for receiving the holding flange, said apparatus further having two delivery plungers, which are subject to movement out of said apparatus front along parallel axes, said plungers having respective centers spaced apart in correspondence with the centers of said double cartridges, the improvement comprising that said retaining guide is generally U-shaped and positioned on both sides of a straight line connecting the centers of both plungers and that the opening of said U-shape extends transversely to said straight line, said opening being dimensioned to slidingly receive said holding flange inserted end-first into said guide, said guide being contoured to engage said two sides and one said end of said flange and constrain said sides and one end against forces at least in the direction of said parallel axes.

2. A dispensing apparatus as in claim 1 with delivery plungers arranged side by side in the apparatus, wherein the slide-in opening is at one of a lateral edge and an upper edge of the apparatus front.

3. A dispensing apparatus as in claim 1, wherein the retaining guide at its end opposing the slide-in opening is shaped as a semi-circle centered on said straight line as viewed in a direction parallel to said plunger axes, said semi-circle corresponding to the circumference of a cartridges cylinder, and means for stopping sliding insertion of said cartridge holding flange at the point of intersection of said straight line with said semi-circle, as viewed in said direction.

4. In a dispensing apparatus adapted for operating double cartridges of the type having an elongated holding flange with two sides longer than the two ends thereof, said apparatus having a front and a retaining guide thereon with a slide-in opening on one side of said guide for receiving said holding flange, said apparatus further having two delivery plungers which are subject to movement out of said apparatus along parallel axes, said plungers having respective centers spaced apart in correspondence with the centers of said double cartridges, the improvement comprising that said retaining guide is generally U-shaped, the opening of said U-shape being dimensioned to slidingly receive said holding flange inserted into said guide, said guide being contoured to engage said two longer sides and one said end of said flange and constrain said sides and one end against forces at least in the direction of said parallel axes.

*5. In a dispensing apparatus adapted for operating double cartridges of the type having an elongated holding flange with two sides longer than the two ends thereof, said apparatus having a front and a retaining guide thereon with a slide-in opening on one side of said guide for receiving the holding flange, said apparatus further having two delivery plungers which plungers are subject to movement out of said apparatus front along parallel axes, said plungers having respective centers spaced apart in correspondence with the centers of said double cartridges, the improvement comprising that said retaining guide includes at least two opposing retaining portions and a stop element at one end thereof, the other end being open and dimensioned to slidingly receive said holding flange inserted into said guide, said retaining portions being arranged to engage said two sides of said flange and said stop element being arranged to abut one end of said flange to stop sliding insertion thereof, at least said two retaining portions constraining said flange against forces at least in the direction of said parallel axes.*

*6. The dispensing apparatus of claim 5 wherein said stop element and said two retaining portions are in a U-shaped form, said two retaining portions forming the sides of said U-shape.*

*7. In a dispensing apparatus adapted for operating double cartridges of the type having an elongated holding flange with two sides longer than the two ends thereof, said apparatus having a front and a retaining guide thereon with a slide-in opening on one side of said guide for receiving the holding flange, said apparatus further having two delivery plungers which plungers are subject to movement out of said apparatus front along parallel axes, said plungers having respective centers spaced apart in correspondence with the centers of said double cartridges, the improvement comprising that the retaining guide is continuous on both sides of a straight line connecting the centers of two plungers and the slide-in opening extends transversely to this straight line.*

*8. The apparatus of claim 7, wherein the retaining guide includes a stop element at its end opposite the slide-in opening to stop sliding insertion of said flange.*

*9. The apparatus of claim 7 wherein said stop element and the continuous parts of the retaining guide are U-shaped in form, the continuous parts forming the sides of the U-shape.*

* * * * *